US012673835B2

(12) United States Patent
Huang et al.

(10) Patent No.: US 12,673,835 B2
(45) Date of Patent: Jul. 7, 2026

(54) SAFETY BARRIER IN AN INDEPENDENT CART SYSTEM AND METHOD OF USING THE SAME

(71) Applicant: Rockwell Automation Technologies, Inc., Mayfield Heights, OH (US)

(72) Inventors: Yuhong Huang, Acton, MA (US); Sawyer J. Desotelle, Eden Prairie, MN (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 152 days.

(21) Appl. No.: 18/614,953

(22) Filed: Mar. 25, 2024

(65) Prior Publication Data

US 2025/0296789 A1     Sep. 25, 2025

(51) Int. Cl.
B65G 54/02          (2006.01)
B65G 43/00          (2006.01)

(52) U.S. Cl.
CPC ............. B65G 54/02 (2013.01); B65G 43/00 (2013.01); *B65G 2203/0283* (2013.01); *B65G 2203/043* (2013.01); *B65G 2207/40* (2013.01)

(58) Field of Classification Search
CPC .................. B65G 54/02; B65G 43/00; B65G 2203/0283; B65G 2203/043; B65G 2207/40

USPC ....................................................... 198/502.1
See application file for complete search history.

(56) References Cited

U.S. PATENT DOCUMENTS

| | | | |
|---|---|---|---|
| 10,717,365 B2 | 7/2020 | Huang et al. | |
| 10,978,969 B2 | 4/2021 | Weber et al. | |
| 12,421,056 B2 * | 9/2025 | Karolus | B65G 54/02 |
| 2008/0217143 A1 * | 9/2008 | Lawless | B65G 13/11 |
| | | | 198/860.1 |
| 2024/0067238 A1 * | 2/2024 | Seal | B61B 13/04 |

* cited by examiner

*Primary Examiner* — Gene O Crawford
*Assistant Examiner* — Lester Ill Rushin
(74) *Attorney, Agent, or Firm* — Boyle Fredrickson, SC

(57)          ABSTRACT

A safety barrier for an independent cart system includes a housing with a base and an indicia portion extending from the base. The indicia portion provides a visual indication of a present location for the housing. A magnet is mounted within the base of the housing, and the magnet generates a sensor magnetic field. A sensor is mounted at a fixed location along a track for the independent cart system, and the sensor generates a feedback signal corresponding to the sensor magnetic field. A controller is operative to inhibit travel of a mover at the fixed location along the track when the feedback signal indicates the magnet is proximate the sensor.

20 Claims, 10 Drawing Sheets

SAFETY BARRIER IN AN INDEPENDENT CART SYSTEM AND METHOD OF USING THE SAME

BACKGROUND INFORMATION

The subject matter disclosed herein relates to a safety barrier for use in an independent cart system. More specifically, a device, having a magnet inside, may be selectively positioned along a length of track for the independent cart system to inhibit travel of vehicles along past the position at which the device is located.

Motion control systems utilizing independent cart technology employ a linear drive system embedded within a track and multiple vehicles, also referred to as "movers" or carts, that are propelled along the track via the linear drive system. Movers and linear drive systems can be used in a wide variety of processes (e.g. packaging, manufacturing, and machining) and can provide an advantage over conventional conveyor belt systems with enhanced flexibility, extremely high-speed movement, and mechanical simplicity. The independently controlled movers or carts are each supported on a track for motion along the track. The movers include drive magnets, which generate a magnetic field forming a first portion of the linear drive system. The track is made up of a number of track segments that, in turn, hold individually controllable electric coils which form a second portion of the linear drive system. Successive activation of the coils establishes a moving electromagnetic field that interacts with the magnetic field from the drive magnets to propel the movers along the track. Sensors are spaced at fixed positions along the track to detect the magnetic fields generated by the drive magnets and to provide information about the position and speed of the movers.

As is known to those skilled in the art, track configurations in the independent cart system are growing increasingly complex. Tracks may include multiple paths with switches that selectively guide a mover along one of the paths. In some applications, the switch may include a translating member that receives a mover from a first path, subsequently moves or rotates to a second path, and permits the mover to exit via the second path. When a translating switch member transitions between two different paths, at least one path is left with an open track segment temporarily disconnected from another track segment onto which a mover may travel. Other applications may include side paths along which movers may be directed for maintenance or to permit human interaction with a payload present on the mover. If a mover is parked along a side path for maintenance or other human interaction, it is desirable to ensure that the interaction is safe for the human.

Historically, it has been known to maintain records of the current locations of each mover and the current operating state of the track in the independent cart system. Safe operation of movers is reliant upon accurate programming. For example, the control program must monitor the present location of the transfer member and only command a mover to travel onto or exit from the transfer member when the transfer member is located adjacent to a track segment. Similarly, the control program must enter a maintenance mode or monitor the location of the mover along a side track to know when human interaction is required. Accurate knowledge of the operating conditions within the system are relied upon to ensure safe operation of the movers during these interactions.

The potential exists, however, that a control program may contain an error or a device along the track may fail, providing incorrect feedback regarding the present operating state of one of the movers or of the track. Incorrect feedback may permit unsafe operation of the movers within the independent cart system, damaging one or more of the movers or causing injury to the human interacting with the system.

Thus, it would be desirable to provide an improved system and method for inhibiting motion and improving safety in an independent cart system.

BRIEF DESCRIPTION

According to one embodiment of the invention a safety barrier for an independent cart system includes a housing, a magnet, a sensor, and a controller. The housing has a base and an indicia portion extending from the base. The indicia portion provides a visual indication of a present location for the housing. The magnet is mounted within the base of the housing and generates a sensor magnetic field. The sensor is mounted at a fixed location along a track for the independent cart system, and the sensor generates a feedback signal corresponding to the sensor magnetic field. The controller is operative to inhibit travel of a mover at the fixed location along the track when the feedback signal indicates the magnet is proximate the sensor.

According to another embodiment of the invention, a system for restricting travel in an independent cart system includes a mover and a drive magnet mounted on the mover. A magnetic field generated by the drive magnet interacts with an electromagnetic field emitted from a track for the independent cart system to propel the mover along the track. The system also includes a safety barrier and multiple sensors spaced along a length of the track. The safety barrier has a safety magnet mounted within the safety barrier. The safety barrier is positioned at a desired location along the length of the track, and the safety magnet generates a sensor magnetic field. Each of the sensors generates a first feedback signal corresponding to a present position of the mover along the length of the track when the mover is proximate a corresponding sensor, and each of the plurality of sensors generates a second feedback signal corresponding to the safety barrier being positioned at the desired location when the desired location is proximate the corresponding sensor. A controller is operative to receive the first feedback signal and the second feedback signal from each of the plurality of sensors, determine the present position of the mover as a function of the first feedback signal, and determine the desired location as a function of the second feedback signal.

According to still another embodiment of the invention, a method for restricting travel in an independent cart system includes positioning a safety barrier at a desired location along a length of a track for the independent cart system, where the safety barrier includes a magnet generating a sensor magnetic field. A feedback signal corresponding to the sensor magnetic field is generated with a sensor mounted at a fixed location along the length of the track. The feedback signal is received at a controller for the track, and travel of a mover is inhibited at the desired location along the track when the feedback signal indicates the magnet is proximate the sensor.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which.

Figure 1:
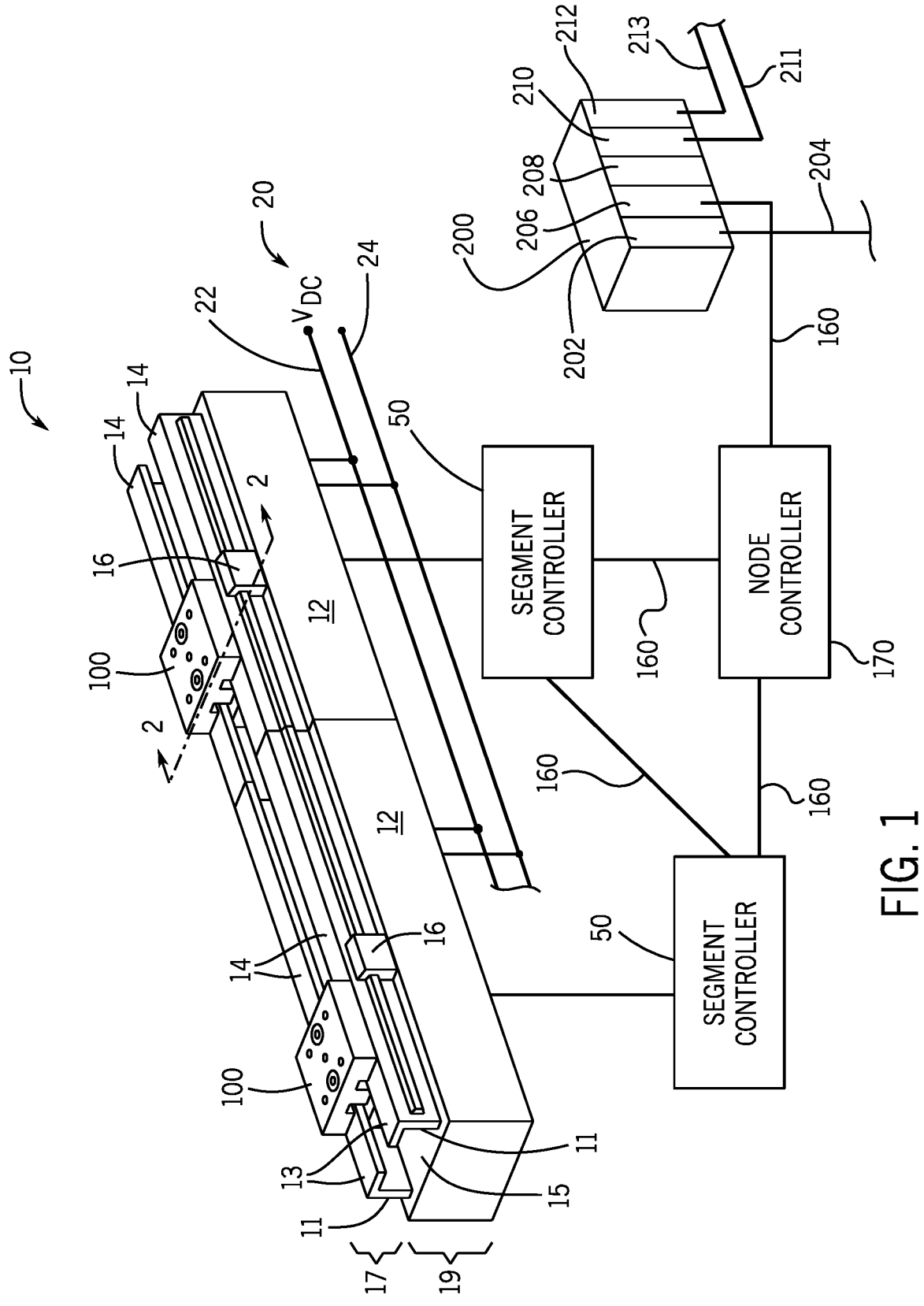
FIG. 1 is a is a schematic representation of an exemplary control system for an independent cart system according to one embodiment of the invention.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION

The various features and advantageous details of the subject matter disclosed herein are explained more fully with reference to the non-limiting embodiments described in detail in the following description.

The subject matter disclosed herein describes an improved system and method for inhibiting motion and improving safety in an independent cart system. A safety barrier is provided for the independent cart system. The safety barrier may be connected to an actuator for automatic insertion and removal from the track. Alternately, the safety barrier may be manually placed at any desired location along the track. The safety barrier includes a magnet mounted within a housing. Preferably, the magnet generates a magnetic field that is at least an order of magnitude weaker in amplitude than the magnetic field generated by the drive magnets. Further, the magnetic field has a different shape than the magnetic field generated by the drive magnets. As a result of the different amplitude and shape of the magnetic field generated by the safety barrier in comparison to the amplitude and shape of the magnetic field generated by the drive magnets, position sensors, used to detect the presence of the drive magnets, may also be used to detect the presence of a safety barrier. The amplitude and shape of the feedback signals generated by the safety barrier varies substantially from the amplitude and shape of the feedback signals generated by the presence of the drive magnets. A controller is able to use the feedback signals generated by the position sensors to detect the presence of a safety barrier in the independent cart system and to inhibit motion along the track responsive to the presence of safety barrier.

Turning initially to FIG. 1, an exemplary transport system for moving articles or products includes a track 10 made up of multiple segments 12. According to the illustrated embodiment, multiple segments 12 are joined end-to-end to define the overall track configuration. The illustrated segments 12 are both straight segments having generally the same length. It is understood that track segments of various sizes, lengths, and shapes may be connected together to form the track 10 without deviating from the scope of the invention. The track 10 is illustrated in a horizontal plane. For convenience, the horizontal orientation of the track 10 shown in FIG. 1 will be discussed herein. Terms such as upper, lower, inner, and outer will be used with respect to the illustrated track orientation. These terms are relational with respect to the illustrated track and are not intended to be limiting. It is understood that the track may be installed in different orientations, such as sloped or vertical, and include different shaped segments including, but not limited to, straight segments, inward bends, outward bends, up slopes, down slopes, right-hand switches, left-hand switches, and various combinations thereof. The width of the track 10 may be greater in either the horizontal or vertical direction according to application requirements. The movers 100 will travel along the track and take various orientations according to the configuration of the track 10 and the relationships discussed herein may vary accordingly.

According to the illustrated embodiment, the track receives power from a distributed DC voltage. A DC bus 20 receives a DC voltage, VDC, from a DC supply and conducts the DC voltage to each track segment 12. The illustrated DC bus 20 includes two voltage rails 22, 24 across which the DC voltage is present. The DC supply may include, for example, a rectifier front end configured to receive a single or multi-phase AC voltage at an input and to convert the AC voltage to the DC voltage. It is contemplated that the rectifier section may be passive, including a diode bridge or, active, including, for example, transistors, thyristors, silicon-controlled rectifiers, or other controlled solid-state devices. Although illustrated external to the track segment 12, it is contemplated that the DC bus 20 would extend within the lower portion 19 of the track segment.

Each track segment 12 includes connectors to which either the DC supply or another track segment may be connected such that the DC bus 20 may extend for the length of the track 10. Optionally, each track segment 12 may be configured to include a rectifier section (not shown) and receive an AC voltage input. The rectifier section in each track segment 12 may convert the AC voltage to a DC voltage utilized by the corresponding track segment.

Each track segment 12 includes an upper portion 17 and a lower portion 19. The upper portion 17 is configured to carry the movers 100 and the lower portion 19 is configured to house the control elements. As illustrated, the upper portion 17 includes a pair of rails 14 extending longitudinally along the upper portion 17 of each track segment 12 and defining a channel 15 between the two rails. Clamps 16 affix to the sides of the rails 14 and secure the rails 14 to the lower portion 19 of the track segment 12. Each rail 14 is generally L-shaped with a side segment 11 extending in a generally orthogonal direction upward from the lower portion 19 of the track segment 12, and a top segment 13 extending inward toward the opposite rail 14. The top segment 13 extends generally parallel to the lower portion 19 of the track segment 12 and generally orthogonal to the side segment 11 of the rail 14. Each top segment 13 extends toward the opposite rail 14 for only a portion of the distance between rails 14, leaving a gap between the two rails 14. The gap and the channel 15 between rails 14 define a guideway along which the movers 100 travel.

According to one embodiment, the surfaces of the rails 14 and of the channel 15 are planar surfaces made of a low friction material along which movers 100 may slide. The contacting surfaces of the movers 100 may also be planar and made of a low friction material. It is contemplated that the surface may be, for example, nylon, Teflon®, aluminum, stainless steel and the like. Optionally, the hardness of the surfaces on the track segment 12 are greater than the contacting surface of the movers 100 such that the contacting surfaces of the movers 100 wear faster than the surface of the track segment 12. It is further contemplated that the contacting surfaces of the movers 100 may be removably mounted to the mover 100 such that they may be replaced if the wear exceeds a predefined amount. According to still other embodiments, the movers 100 may include low-friction rollers to engage the surfaces of the track segment 12. Optionally, the surfaces of the channel 15 may include different cross-sectional forms with the mover 100 including complementary sectional forms. Various other combinations of shapes and construction of the track segment 12 and mover 100 may be utilized without deviating from the scope of the invention.

Figure 2:
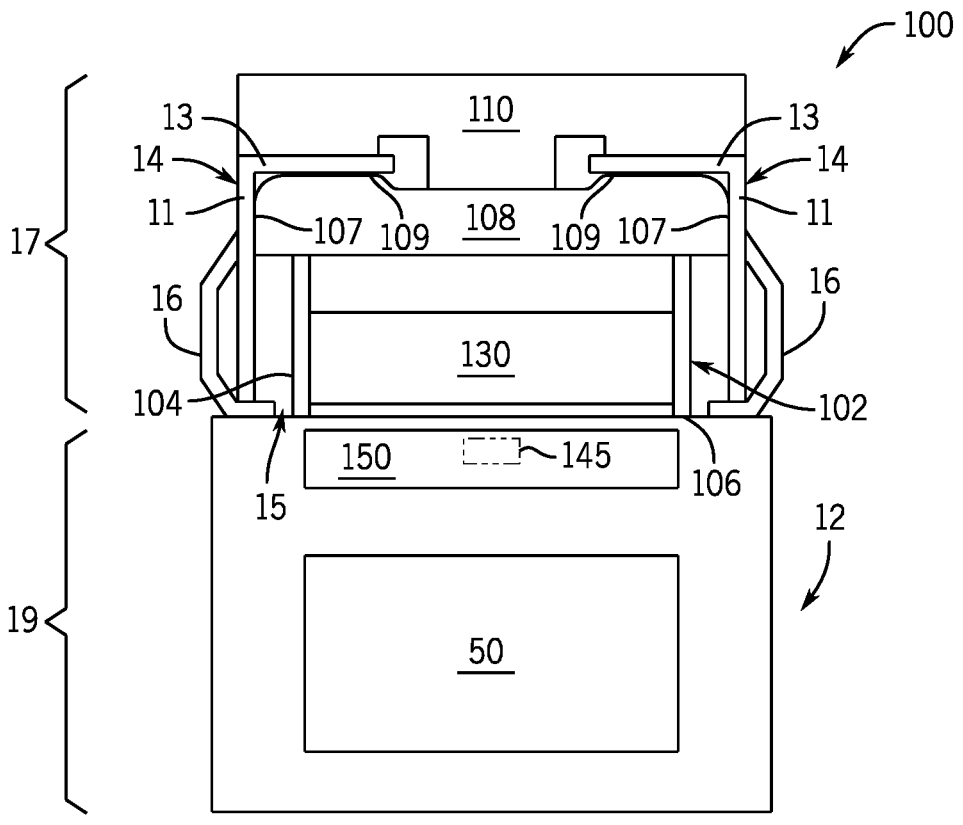
FIG. 2 is a sectional view of one embodiment of a mover and track segment included in the linear drive system taken at 2-2 of FIG. 1.

With reference also to FIG. 2, one embodiment of the mover 100 is configured to slide along the channel 15 as it is propelled by a linear drive system. The mover 100 includes a body 102 configured to fit within the channel 15. The body 102 includes a lower portion 104, configured to hold magnets 130, and an upper portion 108, configured to engage the rails 14. The lower portion has a lower surface 106 to slide along the bottom surface of the channel 15. The upper portion 108 includes side contacting surfaces 107 which slide along an interior surface of the side segments 11 of the rails 14 and upper contacting surfaces 109 which slide along an interior surface of the top segments 13 of the rails 14. The mover 100 also includes a platform 110 mounted to the body 102 of the mover. Various workpieces, clips, fixtures, and the like may be mounted on the top of each platform 110 for engagement with a product to be carried along the track by the mover 100 according to an application's requirements. A central guide portion of the platform 110 extends downward toward the body 102 of the mover 100. The central guide portion has a width less than the gap between the two rails 14 and fits within the gap between rails when the mover 100 is mounted on the track. The central guide portion 118 extends between the top segments 13 of the rails 14 such that the lower contacting surfaces of the platform 110 slide along an exterior surface of the top segments 13 of the rails. According to the illustrated embodiment, the platform 110 is generally square and has a sectional area similar to the sectional area of the body 102 as viewed from the top of the mover 100. It is contemplated that platforms 110, or attachments, of various shapes may be secured to the body 102.

Figure 3:
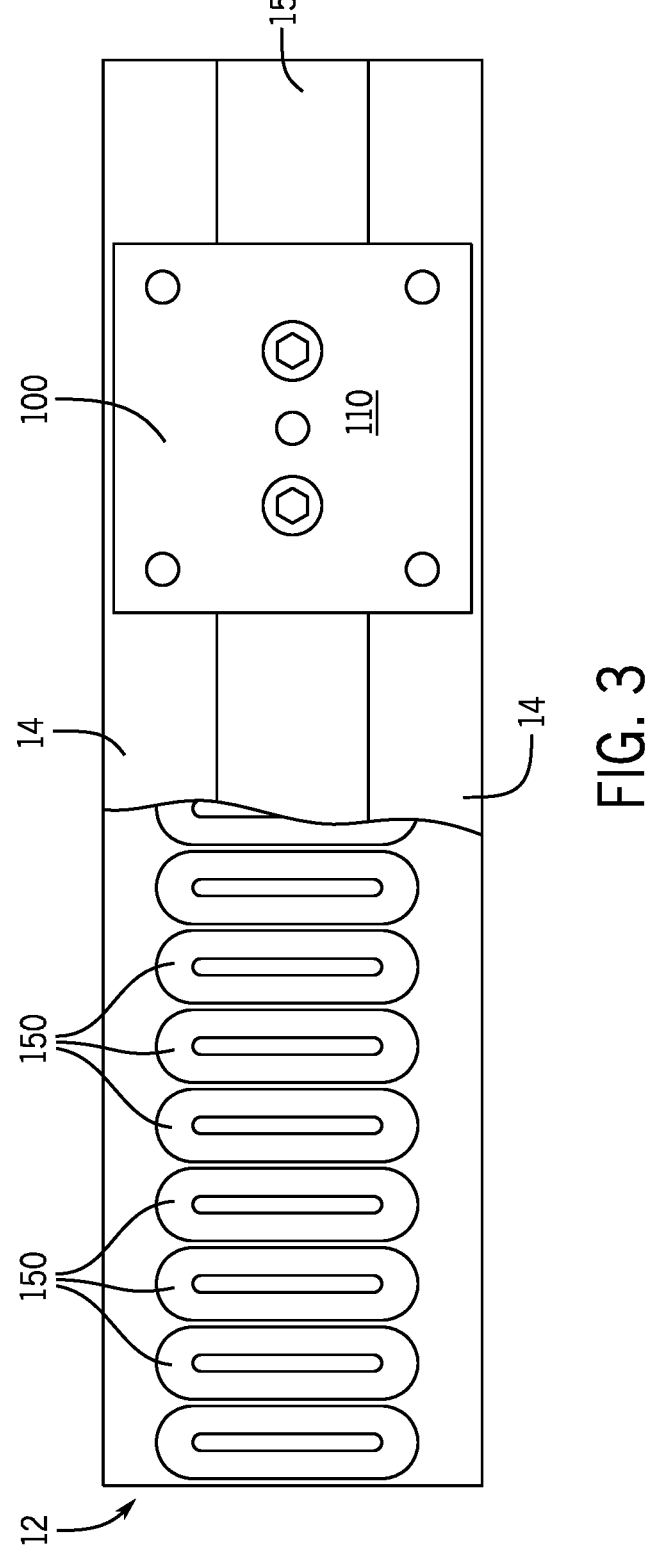
FIG. 3 is a partial top cutaway view of the mover and track segment of FIG. 1.

The mover 100 is carried along the track 10 by a linear drive system. The linear drive system is incorporated in part on each mover 100 and in part within each track segment 12. A first portion of the linear drive system includes one or more drive magnets 130 mounted to each mover 100. With reference to FIG. 2, the drive magnets 130 are arranged in a block on the lower surface of each mover. The linear drive system further includes a series of coils 150 spaced along the length of the track segment 12. With reference also to FIG. 3, the coils 150 may be positioned within a housing for the lower portion 19 of the track segment 12 and below the surface of the channel 15. The coils 150 are energized sequentially according to the configuration of the drive magnets 130 present on the movers 100. The sequential energization of the coils 150 generates a moving electromagnetic field that interacts with the magnetic field of the drive magnets 130 to propel each mover 100 along the track segment 12.

A segment controller 50 is provided within each track segment 12 to control the linear drive system and to achieve the desired motion of each mover 100 along the track segment 12. The segment controller 50 for each track segment 12 regulates current in the coils 150 to generate an electromagnetic field. Further, the segment controller 50 selectively energizes coils 150 along a length of the track segment 12 to create a moving electromagnetic field. This moving electromagnetic field interacts with the magnetic field generated by the drive magnets 130 on each mover 100 to cause the movers 100 to travel along the track segment. Regulating the current such that the electromagnetic field moves along the track segment 12 in a first direction causes the mover 100 to travel in the first direction, and regulating the current such that the electromagnetic field moves along the track segment 12 in the opposite direction causes the mover 100 to travel in the opposite direction.

Although illustrated in FIG. 1 as blocks external to the track segments 12, the arrangement is to facilitate illustration of interconnects between controllers. As shown in FIG. 2, it is contemplated that each segment controller 50 may be mounted in the lower portion 19 of the track segment 12. Each segment controller 50 is in communication with a node controller 170 which is, in turn, in communication with an industrial controller 200. The industrial controller may be, for example, a programmable logic controller (PLC) configured to control elements of a process line stationed along the track 10. The process line may be configured, for example, to fill and label boxes, bottles, or other containers loaded onto or held by the movers 100 as they travel along the line. In other embodiments, robotic assembly stations may perform various assembly and/or machining tasks on workpieces carried along by the movers 100. The exemplary industrial controller 200 includes: a power supply 202 with a power cable 204 connected, for example, to a utility power supply; a communication module 206 connected by a network medium 160 to the node controller 170; a processor module 208; an input module 210 receiving input signals 211 from sensors or other devices along the process line; and an output module 212 transmitting control signals 213 to controlled devices, actuators, and the like along the process line. The processor module 208 may identify when a mover 100 is required at a particular location and may monitor sensors, such as proximity sensors, position switches, or the like to verify that the mover 100 is at a desired location. The processor module 208 transmits the desired locations of each mover 100 to a node controller 170 where the node controller 170 operates to generate commands for each segment controller 50.

A position feedback system provides knowledge of the location of each mover 100 along the length of the track segment 12 to the segment controller 50. According to one embodiment of the invention, the position feedback system includes one or more position magnets mounted to the mover 100. According to another embodiment of the invention, the position feedback system utilizes the drive magnets 130 as position magnets. Position sensors 145 are positioned along the track segment 12 at a location suitable to detect the magnetic field generated by the drive magnets 130. According to the illustrated embodiment, the position sensors 145 are located below or interspersed with the coils 150. The sensors 145 are positioned such that each of the drive magnets 130 are proximate to the sensor as the mover 100 passes each sensor 145. The sensors 145 are a suitable magnetic field detector including, for example, a Hall Effect sensor, a magneto-diode, an anisotropic magnetoresistive (AMR) device, a giant magnetoresistive (GMR) device, a tunnel magnetoresistance (TMR) device, fluxgate sensor, or other microelectromechanical (MEMS) device configured to generate an electrical signal corresponding to the presence of a magnetic field. The magnetic field sensor 145 outputs a feedback signal provided to the segment controller 50 for the corresponding track segment 12 on which the sensor 145 is mounted. The position sensors 145 are spaced apart along the length of the track. According to one aspect of the invention, the position sensors 145 are spaced apart such that adjacent position sensors 145 generate a feedback signal which is offset from each other by ninety electrical degrees (90°). Multiple position sensors 145 are, therefore, generating feedback signals in tandem for a single mover 100 as the mover is travelling along the track 10.

Each controller (i.e., the segment controller 50, the node controller 170, and the programmable logic controller 200) includes at least one processor and non-transitory memory. The non-transitory memory stores instructions for execution by the processor within the controller. It is contemplated that the processor and non-transitory memory may each be a single electronic device or formed from multiple devices. The processor may be a microprocessor. Optionally, the processor and/or the non-transitory memory may be integrated on a field programmable gate array (FPGA) or an application specific integrated circuit (ASIC). The instructions include one or modules, control programs, and/or an operating system to achieve the desired functions of the corresponding controller. Although certain features of the present invention are discussed herein as being performed by specific controllers, in alternate embodiments, some features may be performed by another controller within the system.

Figure 4:
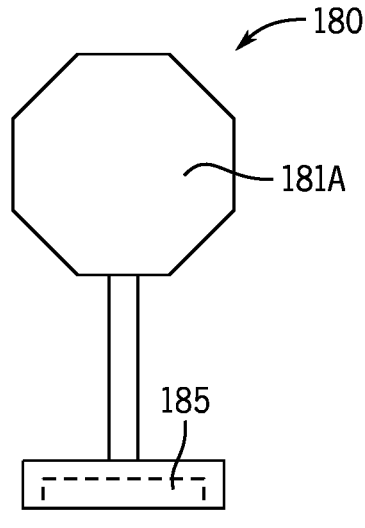
FIG. 4 is a front elevation view of one embodiment of a safety barrier.
Figure 5:
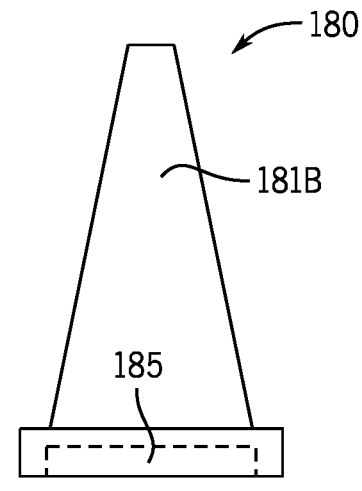
FIG. 5 is a front elevation view of another embodiment of the safety barrier.

According to one aspect of the invention, the safety barrier 180 may come in various shapes and/or sizes. The safety barrier 180 includes a housing 181 having a base and an indicia portion. Turning next to FIG. 4, a first embodiment of a safety barrier 180 is illustrated. The safety barrier 180 includes a housing 181A where the indicia portion is in the shape of a STOP sign. A magnet 185 is mounted in the base of the housing 181A, where the magnet 185 will be proximate the track 10 when the safety barrier 180 is placed on the track. With reference also to FIG. 5, a second embodiment of a safety barrier 180 is illustrated. The safety barrier 180 includes a housing 181B where the indicia portion is in the shape of a cone. A magnet 185 is mounted in the base of the housing 181B, where the magnet 185 will be proximate the track 10 when the safety barrier 180 is placed on the track. FIGS. 4 and 5 represent two embodiments of the safety barrier 180 which may be manually placed on the track 10. The indicia portion provides a visual indicator to a technician that the safety barrier 180 is present and, preferably, a visual indicator of the purpose of the safety barrier.

Figure 6:
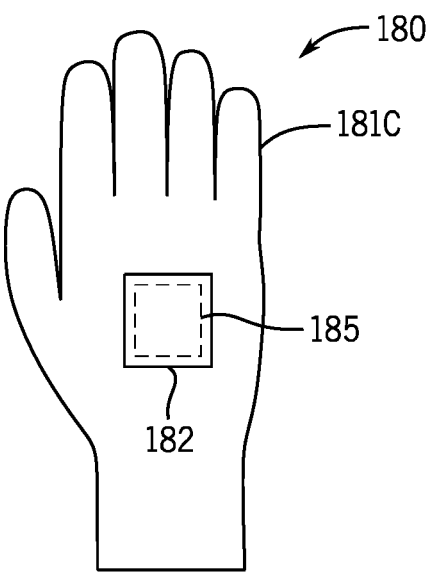
FIG. 6 is a rear elevation view of still another embodiment of the safety barrier.
Figure 7:
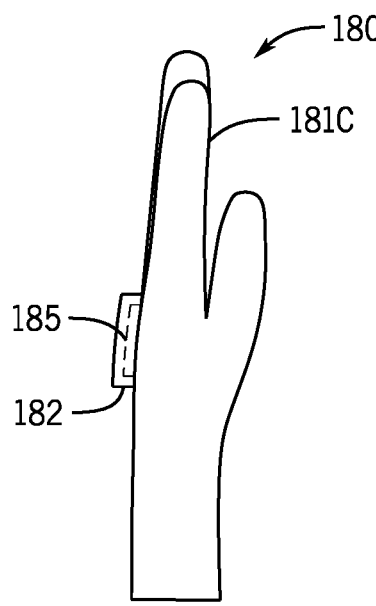
FIG. 7 is a side elevation view of the safety barrier of FIG. 6.

According to another aspect of the invention, the safety barrier 180 may be incorporated into an item wearable by a technician. With reference next to FIGS. 6 and 7, the housing 181C for the safety barrier 180 is a glove that is wearable by the technician. A magnet 185 is mounted in a pocket 182 on the back of the glove 181C. The strength of the magnet 185 is selected such that the position sensors 145 are able to detect the magnetic field of the magnet 185 when the glove 181C is located close enough to the track 10 that the technician's hand would be in the way of a mover 100 travelling along the track 10. Thus, if a technician is performing maintenance on the track 10 or were to reach for the track 10 while wearing the glove 181C, the magnet 185 in the glove would be detected.

When a reference numeral is used herein without a subsequent English character to refer to an object generally. Discussion of the object without an English character applies to different embodiments or different instances of the object. Discussion of an object with a subsequent English character is intended to identify a specific instance or specific embodiment of the object. For example, reference to a safety barrier housing 181 identifies the safety barrier housings generally. Reference to a first safety barrier housing 181A or a second safety barrier housing 181B refers more specifically to the housings illustrated in FIGS. 4 and 5, respectively.

Figure 15:
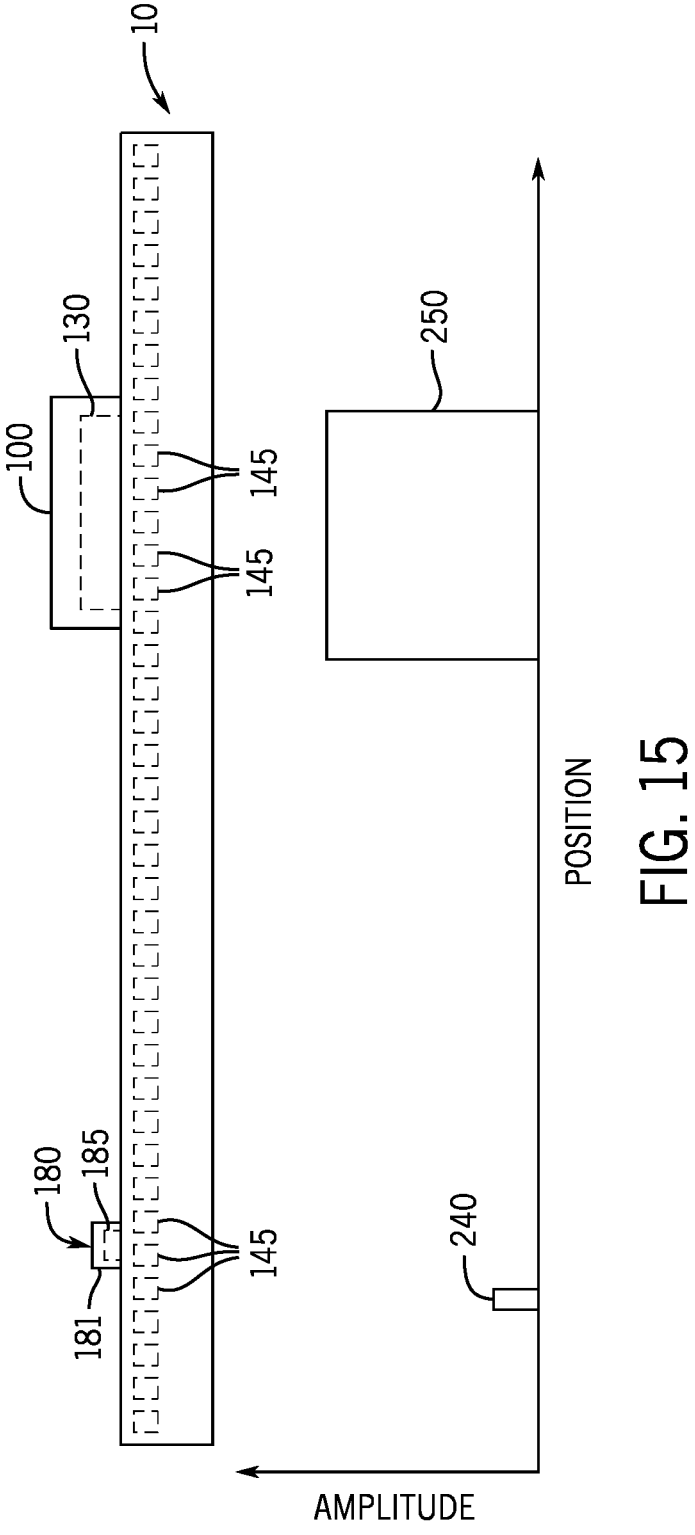
FIG. 15 is a side elevation view of a portion of a track with a mover and a safety barrier positioned on the track along with a graphical representation of feedback signals generated by position sensors responsive to both the mover and the safety barrier being present on the track.

Turning next to FIG. 15, a portion of a track 10 with a mover 100 and a safety barrier 180 positioned on the track 10 is illustrated. The safety barrier 180 is placed on the track segment such that the position sensors 145 are able to detect the magnetic field generated by the magnet 185 in the safety barrier. The first feedback signal 240 shown on the plot below the illustrated track corresponds to an exemplary feedback signal 240 generated by the presence of the safety barrier 180. A mover 100 is also present on the track 10, and a second feedback signal 250 shown on the plot below the illustrated track corresponds to an exemplary feedback signal 250 generated by the presence of a mover 100 on the track 10. The drive magnets 130 extend along the length of the mover 100 and are detected by multiple position sensors 145. Further, the strength of the magnetic field generated by the drive magnets 130 is greater than the strength of the magnet field generated by the magnet 185 in the safety barrier 180. The magnetic field generated by the drive magnets 130 must have sufficient strength to propel the mover 100 along the track 10 responsive to a moving electromagnetic field in the coils 150 of the track 10. In contrast, the magnetic field generated by the safety barrier 180 need only be strong enough to be detected by the position sensors 145. Further, the size of the safety barrier 180 and/or the size of the magnet 185 within the safety barrier need only be detected by a single position sensor 145. In a preferred embodiment, the strength of the magnetic field generated by the drive magnets 130 is at least an order of magnitude greater than the order of magnitude of the magnetic field generated by the magnet 185 in the safety barrier 180.

Figure 8:
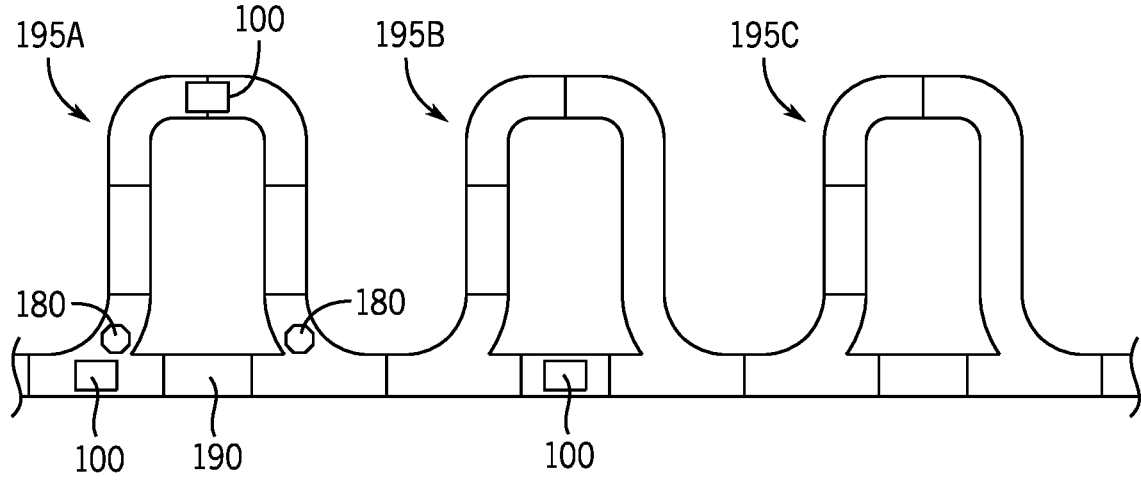
FIG. 8 is a top plan view of a portion of a track layout for an exemplary independent cart system including a pair of safety barriers positioned on the track.

In operation, the safety barrier 180 provides an improved method for inhibiting motion along the track of an independent cart system. Turning next to FIG. 8, a portion of an independent cart system includes a main track 190 and three side tracks 195A, 195B, 195C. A mover 100 may be commanded to one of the side tracks 195A, 195B, 195C for maintenance, for loading, for unloading, for inspection, or for other potential interaction with a technician. According to the illustrated embodiment, a mover 100 has stopped along the first side track 195A. A first safety barrier 180 is placed at the entrance to the side track 195A, and a second safety barrier 180 is placed at the exit from the side track 195A. The segment controllers 50 in each of the corresponding switch track segments at the entrance and exit of the side track 195A detect the presence of the corresponding safety barrier 180. As an initial step, the segment controller 50 detecting the presence of a safety barrier 180 prevents coils 150 along the portion of the switch tracks segments on which the safety barrier 180 is located from generating an electromagnetic field. The switch track segments will allow a mover 100 to continue straight along the main track 190 but inhibit a mover 100 from entering or exiting the first side track 195A. As a second step, the segment controllers 50 for each of the switch track segments are in communication with a node controller 170 for the first side track 195A, the industrial controller 200, or some other controller responsible for scheduling delivery of movers 100 within the independent cart system. Each segment controller 50 for the switch track segments indicates the presence of one of the safety barriers 180. The node controller 170, industrial controller 200, or other fleet controller is configured to recognize that the safety barriers 180 are at the entrance and exit of the first side track 195A. The node controller 170, industrial controller 200, or other fleet controller generates a signal to the segment controller 50 for each track segment 12 present along the first side track 195A to disable operation of each track segment 12. Thus, the entire portion of the track located between the two safety barriers 180 is disabled. In this manner, a technician may perform maintenance on the mover 100, load or unload payload from the mover 100, or take some other interaction with the mover 100 and/or payload on the mover without worry that the mover 100 may begin moving during the interaction.

Figure 9:
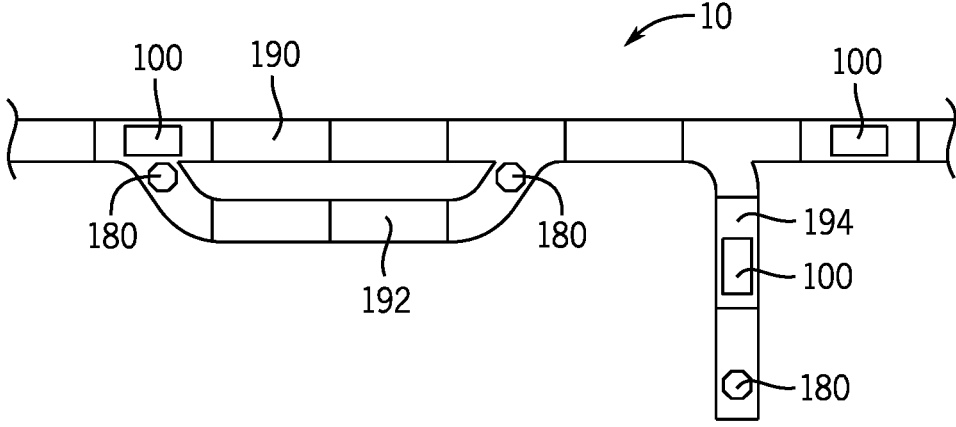
FIG. 9 is a top plan view of a portion of another track layout for an exemplary independent cart system including multiple safety barriers positioned on the track.

According to another aspect of the invention, the safety barriers 180 may facilitate commissioning and/or maintenance of the track 10 for the independent cart system. With reference next to FIG. 9, a portion of the track for the independent cart system includes a main track 190, a first branch segment 192, and a second branch segment 194. The first branch segment 192 may temporarily need to be taken offline for servicing. A first safety barrier 180 is placed at the entrance to the first branch segment 192, and a second safety barrier 180 is placed at the exit to the first branch segment 192. The corresponding segment controller 50 in each switch track segment on which the safety barrier 180 is located detects the presence of the safety barrier 180 along the portion of the switch track segment extending into the first branch 192. Each segment controller 50 communicates the location of the safety barrier to a node controller 170 responsible for the first branch 192 or to the industrial controller 200 such that either the node controller or the industrial controller identifies the pair of segment controllers 50 and inhibits motion on each track segment 12 along the first branch 192. Movers are able to travel along the main track 190 to circumvent the portion of the track 10 being serviced. Similarly, if the main line between the entrance and exit to the first branch 192 was taken offline for servicing, the safety barriers could placed on the portion of the switch track segments extending along the mainline. The node controller 170 or the industrial controller 200 would then inhibit motion on each track segment 12 along the main line between the entrance and exit to the first branch 192. Movers would still be able to travel along the first branch 192 to circumvent the portion of the track 10 being serviced.

Although both illustrations above show the safety barriers 180 being placed along branches of switch track segments, the safety barriers 180 may similarly be placed on any track segment 12. A segment controller 50 corresponding to the track segment 12 on which the safety barrier has been placed will inhibit current to the coils 150 of at least a portion of the track segment 12 corresponding to the location of the safety barrier 180. Additionally, the segment controller 50 communicates the presence of the safety barrier 180 to one or more adjacent segment controllers 50 as required, such that a mover 100 approaching the safety barrier 180 is decelerated to a stop prior to reaching the safety barrier 180. If two safety barriers 180 are detected along a length of track 10, a node controller 170 or central controller 200 determines the shortest path between the two safety barriers 180 and disables the track segments 12 located between the two safety barriers 180. Thus, two safety barriers 180 may be used to temporarily disable a portion of the track 10. In some applications, a parameter may define a maximum number of track segments 12 that may be located between safety barriers 180 in order to disable the track segments 12 between safety barriers 180. The parameter may, for example, be set to three, requiring a safety barrier 180 to be placed at every fourth track segment 12, such that there are only three track segments 12 located between safety barriers 180 to be disabled. This setting permits multiple segments to be taken out of service in larger independent cart systems. It also provides a periodic visual cue to operators along a length of track being disabled if there is a longer stretch of the track 10 being disabled.

According to another aspect of the invention, each segment controller 50 may communicate with the industrial controller 200 to report the presence of a safety barrier 180 on the track 10. The industrial controller 200 may be in communication with a human machine interface (HMI) and provide the operator with a visual indication of the location of safety barriers 180 and disabled track segments.

As also illustrated in FIG. 9, the safety barrier 180 may be useful during commissioning. For the illustrated portion of track 10, the second branch segment 194 is still being installed. Only two track segments 12 extend from the switch track segment selecting either the main track 190 or the second branch segment 194. A safety barrier 180 is placed at the end of the second track segment along the second branch segment. This safety barrier 180 will disable the coils 150 along the second track segment and communicate to the first track segment along the second branch, if needed, to begin decelerating movers 100 traveling onto the second branch segment 194. Operation of the switch track segment may be tested and operation along the main track segment 190 may continue while the remainder of the second branch segment 194 is being installed without having a mover 100 travel off the end of the second branch segment.

Figure 10:
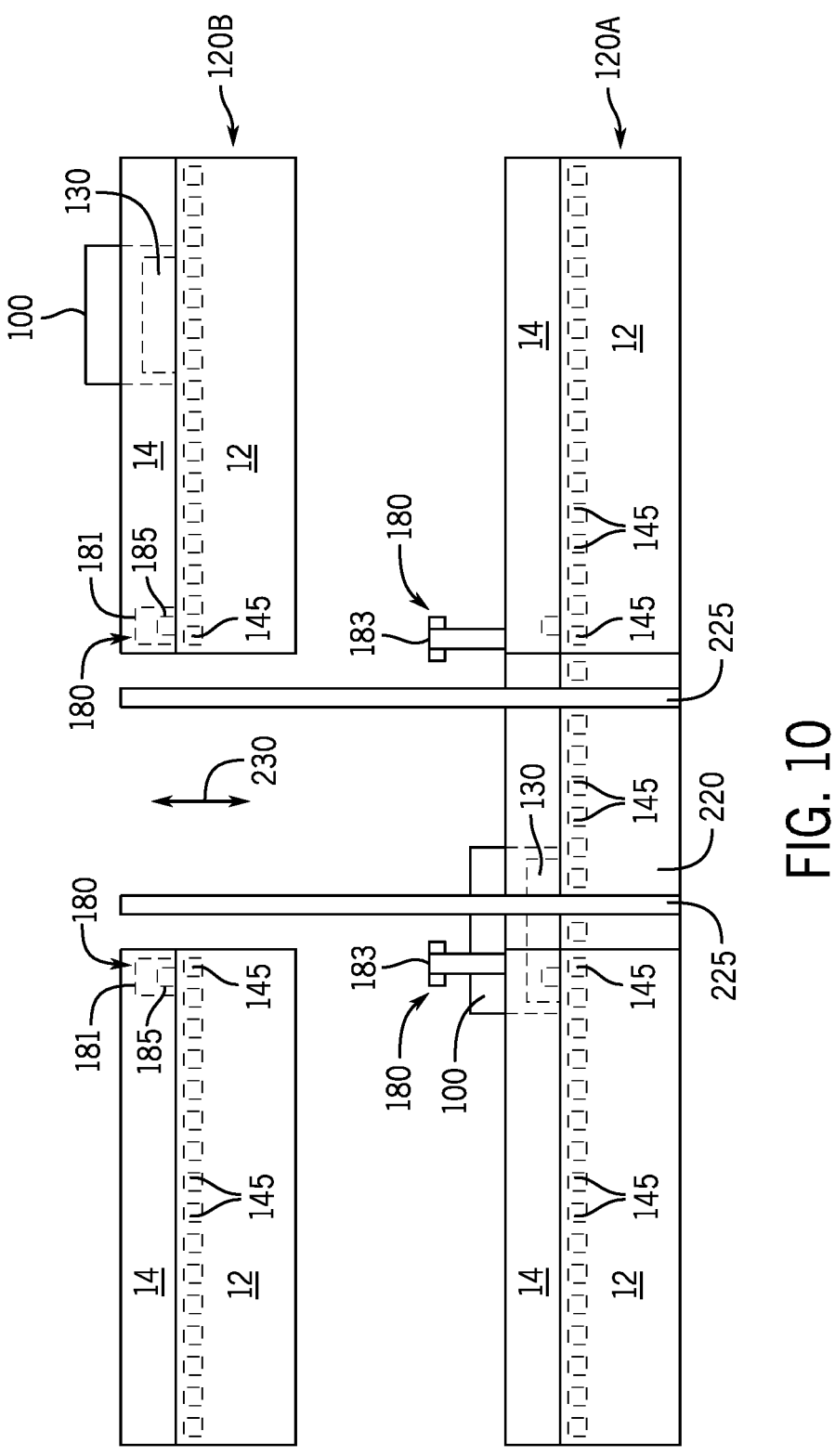
FIG. 10 is a side elevation view of two tracks positioned one above the other with a lift member aligned with the lower track.
Figure 11:
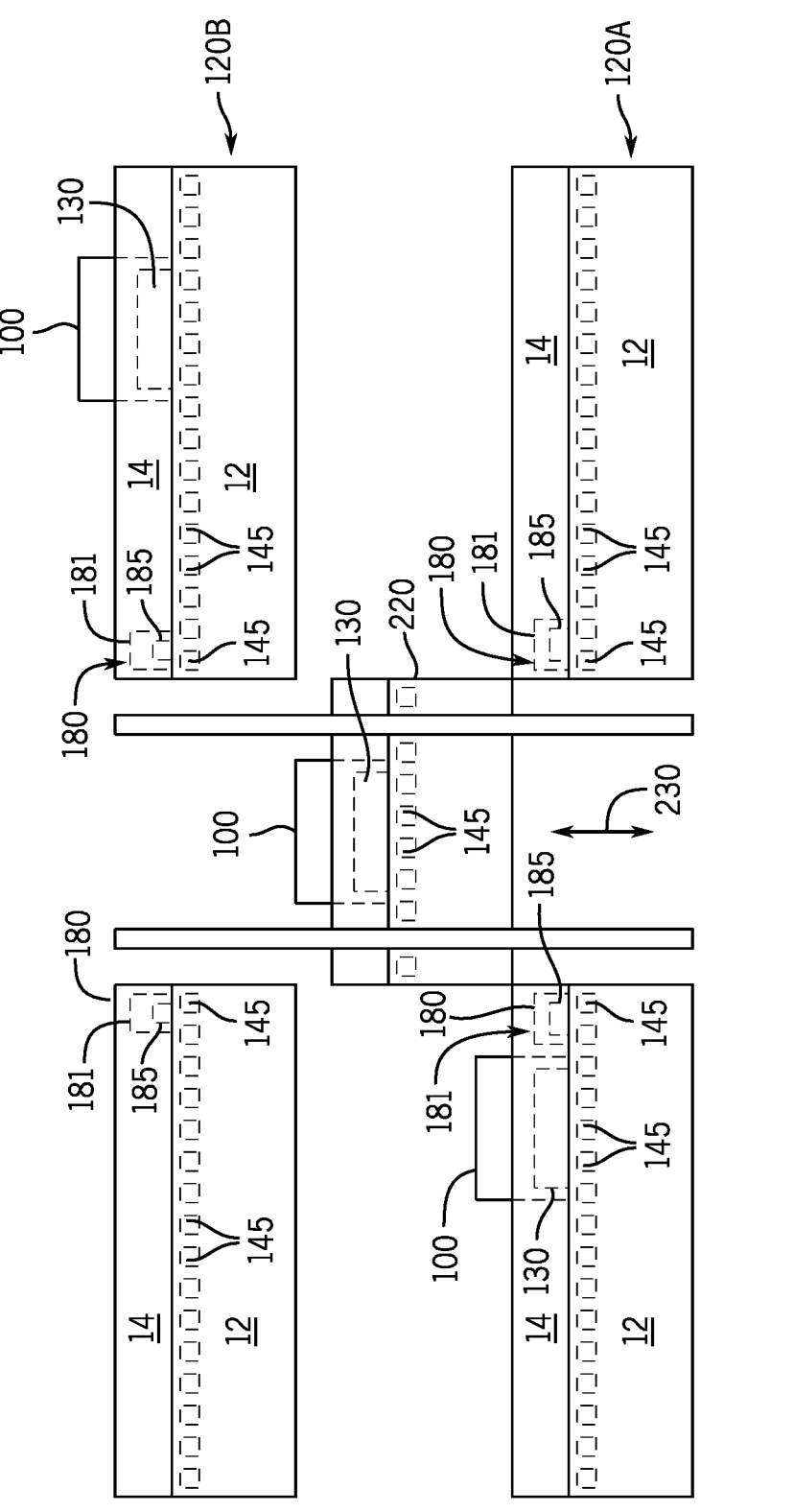
FIG. 11 is a side elevation view of the two tracks of FIG. 10 with the lift member transitioning to the upper track.
Figure 12:
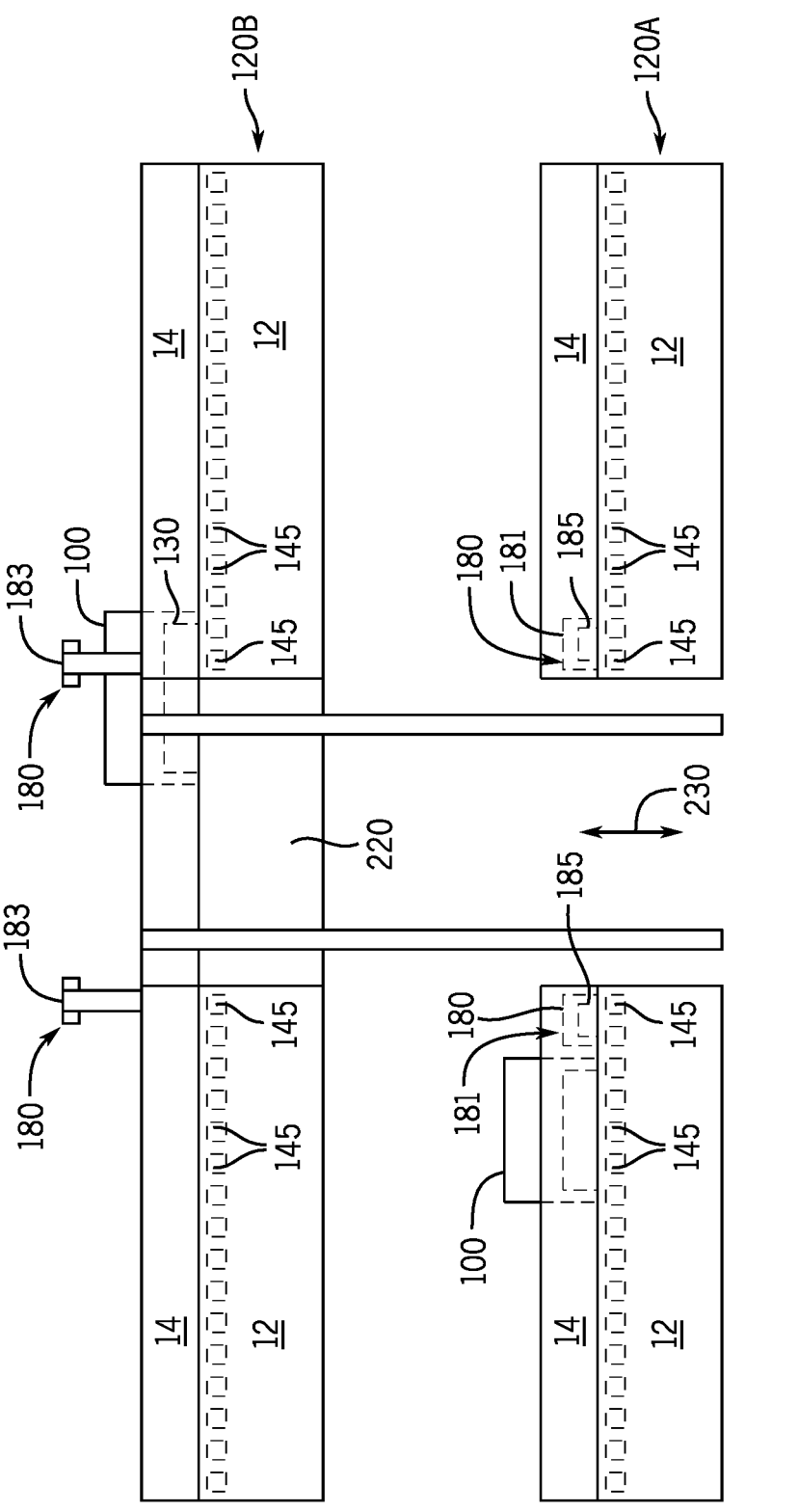
FIG. 12 is a side elevation view of the two tracks of FIG. 10 with the lift member aligned with the upper track.
Figure 13:
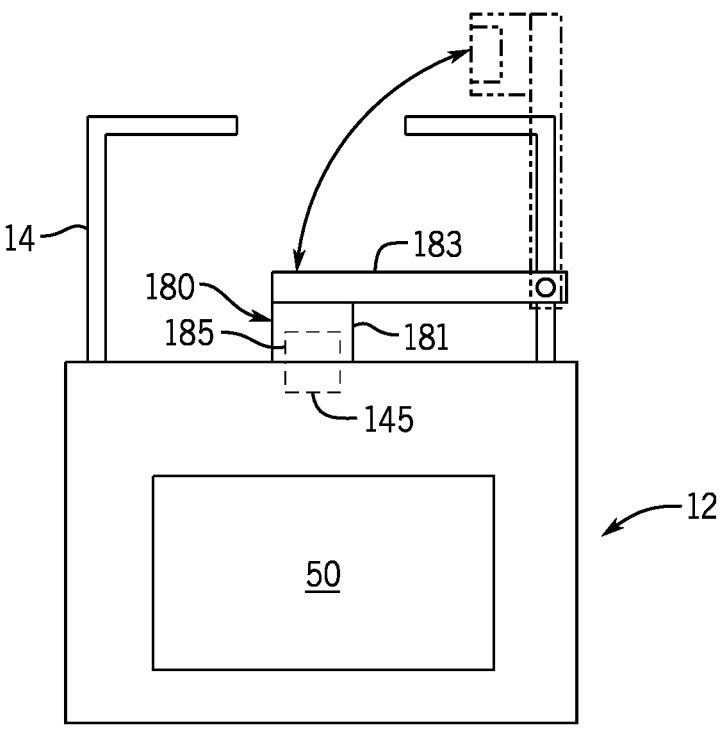
FIG. 13 is a sectional view of a track segment with an automated safety barrier shown.

With reference next to FIGS. 10-13, the safety barrier 180 may be connected to an actuator to selectively position the barrier along the track 10. FIGS. 10-12 illustrate an independent cart system with two tracks 120A, 120B arranged vertically one above the other. A lift track segment 220 moves on rails 225 along an axis 230 between the lower track 120A and the upper track 120B. An arm 183 is positioned at the end of each track 120A, 110B with a safety barrier 180 mounted to the arm. According to the illustrated embodiment, the housing 181 for the automatic safety barriers 180 are represented as a block with a magnet 185 positioned in the lower portion of the housing 181. As seen in FIG. 13, the arm 183 is configured to transition between a lowered position and a raised position. When the arm 183 is in the lowered position, the magnet 185 is proximate a position sensor 145 in the track segment 12 and the magnetic field generated by the magnet 185 is detected. When the arm 183 is in the raised position, the magnet 185 is removed a sufficient distance from the position sensor 145 such that the magnetic field generated by the magnet 185 is no longer detected.

In FIG. 10, the lift track segment 220 is aligned with the lower track 120A. Each arm 183 on the lower track 120A is raised, allowing a mover 100 to travel from the track segments 12 adjacent to the lift track segment 220 onto the lift track segment 220. A mover 100 may be commanded to travel across the lift track segment 220 and continue on the lower track 120A, or the mover 100 may be commanded to stop on the lift track segment 220, where it can be raised to the upper track 120B. Each arm 183 on the upper track 120B is lowered such that the safety barrier 180 mounted to the arm is positioned adjacent to the position sensors 145 in the track segments 12 on the upper track 120B adjacent to the lift. Because the lift track segment 220 is not present between the track segments 12 adjacent to the lift on the upper track 120B, a mover 100 could otherwise travel off the track segment, falling onto the lift track segment 220. The presence of the safety barrier 180 is detected by the corresponding segment controller 50 on the track segment 12, and the segment controller 50 inhibits current to the coils 150 along at least a portion of the track segment 12 and controls movers 100 entering the track segment to come to a stop prior to the safety barrier 180.

In FIG. 11, the lift track segment 220 is transitioning between the lower track 120A and the upper track 120B. Each arm 183 on both the lower track 120A and the upper track 120B is lowered such that the safety barrier 180 mounted to the arm is positioned adjacent to the position sensors 145 in the track segments 12 adjacent to the lift track segment 220. The safety barriers 180 prevent movers 100 from travelling off either the lower track 120A or the upper track 120B into the region of the lift track segment 220.

In FIG. 12, the lift track segment 220 is aligned with the upper track 120B. Each arm 183 on the upper track 120B is raised, allowing the mover 100 to travel from the lift track segment 220 to either of the track segments 12 adjacent to the lift track segment 220. The illustrated mover 100 is commanded to travel to the right from the lift track segment 220 and onto the upper track 120B. Each arm 183 on the lower track 120A is lowered such that the safety barrier 180 mounted to the arm is positioned adjacent to the position sensors 145 in the track segments 12 on the lower track 120A adjacent to the lift. Because the lift track segment 220 is not present between the track segments 12 adjacent to the lift on the lower track 120A, a mover 100 could otherwise travel off the track segment, falling into the space for the lift track segment 220. The presence of the safety barrier 180 is detected by the corresponding segment controller 50 on the track segment 12, and the segment controller 50 inhibits current to the coils 150 along at least a portion of the track segment 12 and controls movers 100 entering the track segment to come to a stop prior to the safety barrier 180. According to one aspect of the invention, an actuator may be provided on each arm 183 holding a safety barrier 180. The actuators are controlled in cooperation with the lift track segment 220 to be lowered when the lift track segment 220 is not aligned with a track and to be raised when the lift track segment 220 is aligned with a track. Optionally, each arm 183 may be passively raised/lowered via a member mounted on the lift track segment 220. The member mounted on the lift track segment is configured to engage the arm 183 as the lift track segment 220 arrives between adjacent track segments 12 to raise the arm and to disengage the arm 183 as the lift track segment 220 leaves the space between adjacent track segments 12 to lower the arm.

Figure 14:
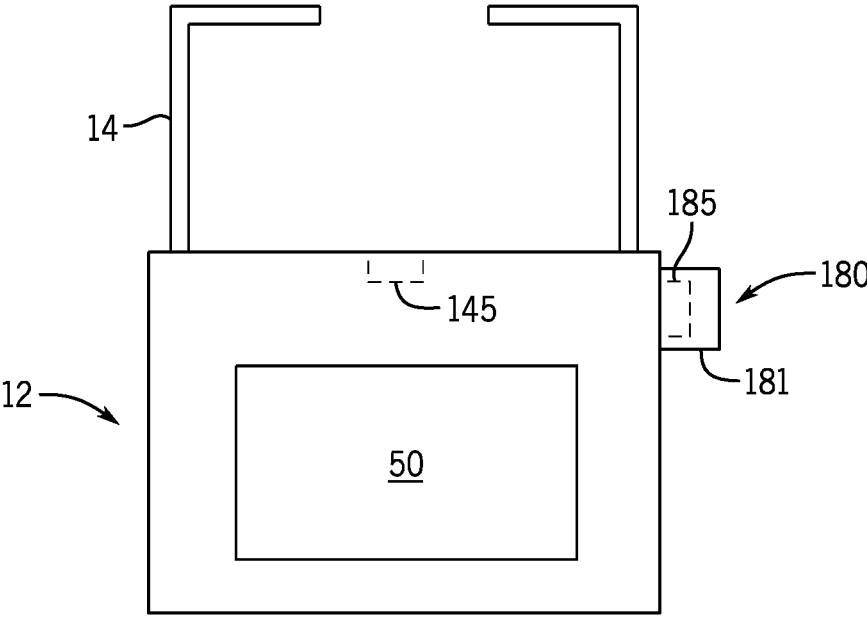
FIG. 14 is a sectional view of a track segment with a manual safety barrier mounted a side of a track segment.

With reference next to FIG. 14, another embodiment of the invention is illustrated. The position sensor 145 in the track segment includes a multi-axis magnetic field detector. The multi-axis magnetic field detector generates separate feedback signals for magnetic fields detected in an x-axis, a y-axis, and a z-axis. Each feedback signal corresponds to a strength of the magnetic field along the corresponding axis. The drive magnets 130 mounted on each mover 100 pass the position sensor 145 from within the channel 15 of each track segment 12. The safety barrier 180 is mounted along the side of each track segment 12. In addition to having different magnitude and size of magnetic field, mounting the safety barrier 180 along the side of the track segment, causes the magnetic field generated by the safety barrier to be detected along a different axis than detection of the magnetic field generated by the drive magnets. The segment controller 50 is thereby further able to distinguish between a magnetic field generated by the drive magnets 130 and a magnetic field generated by the safety barrier 180.

With reference again to FIGS. 6 and 7, it is contemplated that a technician may have a wearable safety barrier 180/ safety device. The wearable safety barrier 180 may be used in cooperation with additional safety barriers 180 placed along the track or with programming to disable a portion of the track 10 while a technician is working along the track segment 12. The magnetic field generated by the magnet 185 present in the glove has a strength of sufficient amplitude that the magnetic field is detected by the position sensors 145 when the glove is within a distance from the position sensor 145 that corresponds to sectional area of the mover 100. In this manner, if a technician is working along a track segment 12 and the hands of the technician are within range of the track 10 such that the technician could be struck by a mover 100 travelling along the track 10, the position sensors 145 will detect the presence of the magnet 185 and, therefore, detects the presence of the technician. The segment controller 50, in turn, disables the coils proximate to a position sensor 145 which detects the presence of a technician preventing a mover 100 from striking a technician working along the track 10.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. A system for restricting travel in an independent cart system, comprising:
   a safety barrier, including:
      a housing including a base and an indicia portion extending from the base, wherein the indicia portion provides a visual indication of a present location for the housing, and
      a magnet mounted within the base of the housing, wherein the magnet generates a safety barrier magnetic field;
   a sensor mounted at a fixed location along a track for the independent cart system, wherein the sensor generates a feedback signal corresponding to the safety barrier magnetic field; and
   a controller in communication with the sensor to receive the feedback signal and operative to inhibit travel of a mover at the fixed location along the track when the feedback signal indicates the magnet is proximate the sensor, wherein:
      the mover includes a drive magnet mounted on the mover for propulsion along the track,
      the sensor generates a second feedback signal corresponding to a second magnetic field from the drive magnet when the mover is not inhibited from travelling along the track, and
      the second feedback signal is different than the feedback signal corresponding to the safety barrier magnetic field.

2. The system of claim 1, wherein:
   the sensor is a position sensor generating the second feedback signal corresponding to a location of the mover as a function of the second magnetic field; and
   an amplitude of the second magnetic field is greater than an amplitude of the safety barrier magnetic field.

3. The system of claim 1, wherein the housing is removable from the track and wherein the housing is selectively positioned at a plurality of locations along the track.

4. The system of claim 1, further comprising an actuator to selectively position the safety barrier at a desired location.

5. The system of claim 1, wherein the the safety barrier is a first safety barrier, the system further comprising:
   a second safety barrier including:
      a second housing including a base and an indicia portion extending from the base, wherein the indicia portion provides a visual indication of a present location for the second housing, and
      a second magnet mounted within the base of the second housing, wherein the second magnet generates a second safety barrier magnetic field; and
   a second sensor mounted at a second fixed location along the track for the independent cart system, wherein the second sensor generates a third feedback signal corresponding to the second safety barrier magnetic field, wherein the controller is in communication with the second sensor to receive the third feedback signal and is further operative to inhibit travel of the mover along a portion of the track located between the first fixed location and the second fixed location.

6. The system of claim 1, wherein:
   the housing is configured to be worn by a technician in proximity to the independent cart system;
   the base is a pocket in the housing; and
   the magnet is inserted into the pocket.

7. The system of claim 6, wherein the housing is a glove.

8. A system for restricting travel in an independent cart system, comprising:
   a mover including a drive magnet mounted on the mover, wherein a magnetic field generated by the drive magnet interacts with an electromagnetic field emitted from a track for the independent cart system to propel the mover along the track;
   a safety barrier including a safety magnet mounted within the safety barrier, wherein the safety barrier is positioned at a desired location along a length of the track and the safety magnet generates a sensor magnetic field;
   a plurality of sensors spaced along the length of the track, wherein each of the plurality of sensors generates a first feedback signal corresponding to a present position of the mover along the length of the track when the mover is proximate a corresponding sensor and each of the plurality of sensors generates a second feedback signal corresponding to the safety barrier being positioned at the desired location when the desired location is proximate the corresponding sensor; and
   a controller operative to:
   receive the first feedback signal and the second feedback signal from each of the plurality of sensors,
   determine the present position of the mover as a function of the first feedback signal, and
   determine the desired location as a function of the second feedback signal.

9. The system of claim 8 wherein the safety barrier further comprises a housing including a base and an indicia portion extending from the base, wherein: the indicia portion provides a visual indication of a present location for the housing, and the safety magnet is mounted within the base of the housing.

10. The system of claim 8, wherein an amplitude of the magnetic field generated by the drive magnet is greater than an amplitude of the sensor magnetic field.

11. The system of claim 8, wherein the safety barrier is removable from the track and wherein the safety barrier is selectively positioned at a plurality of locations along the track.

12. The system of claim 8, further comprising an actuator to selectively position the safety barrier at the desired location.

13. The system of claim 8, further comprising:
   a second safety barrier including a second safety magnet mounted within the second safety barrier, wherein the second safety barrier is positioned at a second desired location along the length of the track and the second safety magnet generates a second sensor magnetic field, wherein the controller is further operative to:
   determine the second desired location as a function of one of the plurality of sensors detecting the second sensor magnetic field, and inhibit travel of the mover along a portion of the track located between the desired location and the second desired location.

14. The system of claim 8, wherein:

the safety barrier includes a housing configured to be worn by a technician in proximity to the independent cart system; and the safety magnet is inserted into a pocket in the housing.

15. A method for restricting travel in an independent cart system, comprising the steps of:

positioning a safety barrier at a desired location along a length of a track for the independent cart system, wherein the safety barrier includes a magnet generating a safety barrier magnetic field;

generating a feedback signal corresponding to the safety barrier magnetic field with a sensor mounted at a fixed location along the length of the track;

receiving the feedback signal at a controller for the track; and inhibiting travel of a mover at the desired location along the track when the feedback signal indicates the magnet is proximate the sensor, wherein:

the mover includes a drive magnet mounted on the mover for propulsion along the track, the sensor generates a second feedback signal corresponding to a second magnetic field from the drive magnet when the mover is not inhibited from travelling along the track, and the second feedback signal is different than the feedback signal corresponding to the safety barrier magnetic field.

16. The method of claim 15, wherein:

the sensor is a position sensor generating the second feedback signal corresponding to a location of the mover as a function of the second magnetic field; and an amplitude of the second magnetic field is greater than an amplitude of the sensor magnetic field.

17. The method of claim 15, further comprising the step of selectively positioning the safety barrier at a plurality of locations along the track.

18. The method of claim 15, further comprising the step of selectively positioning the safety barrier at the desired location with an actuator.

19. The method of claim 15, wherein the safety barrier is a first safety barrier, the desired location is a first desired location, the magnet is a first magnet, the safety barrier magnetic field is a first safety barrier magnetic field, the feedback signal is a first feedback signal, the sensor is a first sensor, and the fixed location is a first fixed location, the method further comprising the steps of:

positioning a second safety barrier at a second desired location along the length of the track, wherein the second safety barrier includes a second magnet generating a second safety barrier magnetic field;

generating a third feedback signal corresponding to the second safety barrier magnetic field with a second sensor mounted at a second fixed location along the length of the track;

receiving the third feedback signal at the controller for the track; and inhibiting travel of the mover along a portion of the track located between the first fixed location and the second fixed location.

20. The method of claim 15, wherein the safety barrier includes a visual indicia, the method further comprising the step of indicating to a technician the presence of the safety barrier via the visual indicia.

\* \* \* \* \*